US009250639B2

(12) United States Patent
Kojori

(10) Patent No.: US 9,250,639 B2

(45) Date of Patent: Feb. 2, 2016

(54) ADVANCED ENERGY MANAGEMENT

(75) Inventor: Hassan Ali Kojori, Mississauga (CA)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 690 days.

(21) Appl. No.: 13/593,077

(22) Filed: Aug. 23, 2012

(65) Prior Publication Data

US 2014/0055111 A1 Feb. 27, 2014

(51) Int. Cl.
*H02M 7/5387* (2007.01)
*G05F 1/44* (2006.01)

(52) U.S. Cl.
CPC ........................................ *G05F 1/44* (2013.01)

(58) Field of Classification Search
USPC ......... 363/17, 55, 56.01, 56.02, 65, 131, 132, 363/40, 41; 307/43, 46, 48, 64, 66
See application file for complete search history.

(56) References Cited

U.S. PATENT DOCUMENTS 5,446,645 A * 8/1995 Shirahama et al. ............. 363/71
5,850,113 A 12/1998 Weimer et al.
7,692,331 B2 4/2010 Langlois et al.
7,786,620 B2 8/2010 Vuk et al.
7,948,118 B2 * 5/2011 Chambon ........................ 307/66
7,952,231 B1 5/2011 Zansky et al.
8,138,720 B2 3/2012 Snyder et al.
8,143,856 B2 * 3/2012 Andrea et al. ................ 320/128
2006/0061922 A1 3/2006 Mihai
2007/0236187 A1 * 10/2007 Wai et al. ...................... 323/222
2008/0058998 A1 3/2008 Breit
2008/0217471 A1 9/2008 Lio et al.
2009/0302153 A1 12/2009 Matasso et al.
2010/0123435 A1 5/2010 Piazza et al.
2011/0140513 A1 6/2011 Brookfield
2011/0184579 A1 7/2011 Nilsen et al.
2011/0227406 A1 9/2011 Nguyen

* cited by examiner

*Primary Examiner* — Nguyen Tran

(74) *Attorney, Agent, or Firm* — Shimokaji IP

(57) ABSTRACT

A system adapted to regulate a voltage of a supply bus is described. The system includes a source adapted to supply a source current to the supply bus, a load adapted to draw a load current from the supply bus, and a bi-directional voltage to current converter adapted to provide an output current, where the output current is at least partly based on the source current and the load current.

17 Claims, 6 Drawing Sheets

ADVANCED ENERGY MANAGEMENT

BACKGROUND OF THE INVENTION

The present invention generally relates to more electric architecture (MEA), where traditionally hydraulic and pneumatic subsystems of an aircraft are replaced with electric loads.

Such electric loads may include electro-hydrostatic actuators (EHAs), electromechanical actuators (EMAs), advanced radar, and directed energy weapons (DEW).

Such loads may cause repeated, rapid, wide fluctuation of load currents (e.g., peak-to-average power ratios exceeding five to one with time intervals from fifty milliseconds to five seconds), regenerative power flow equal to peak power draw for brief periods of time (e.g., twenty to two hundred milliseconds), and poor power quality on a bus used to supply the electric loads.

As can be seen, there is a need for a way to meet stringent average, pulsed and regenerative power requirements and facilitate optimized real-time power flow control, management, delivery, and integrated protection among various sources of DC power and/or energy storage systems.

SUMMARY OF THE INVENTION

In one aspect of the present invention, a system is adapted to regulate a voltage of a supply bus. The system includes: a source adapted to supply a source current to the supply bus; a load adapted to draw a load current from the supply bus; and a bi-directional voltage to current converter adapted to provide an output current, wherein the output current is at least partly based on the source current and the load current.

In another aspect of the present invention, a bi-directional voltage to current converter includes: an inductor coupled to a supply bus; a set of switches adapted to connect the inductor to an energy storage device; and a pulse-width modulation (PWM) controller adapted to control the operation of the set of switches.

In yet another aspect of the present invention, a method is adapted to provide a set of gate driver outputs for a pulse width modulation (PWM) controller. The method: retrieves a PWM period associated with the PWM controller; determines a reference current associated with a source and a load coupled to a supply bus; calculates a duty cycle based at least partly on the retrieved PWM period and the received reference current; and generates the set of gate driver outputs based at least partly on the calculated duty cycle.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a way to meet stringent average, pulsed and regenerative power requirements and facilitate optimized real-time power flow control, management, delivery, and integrated protection among various sources of DC power and/or energy storage systems.

Figure 1:
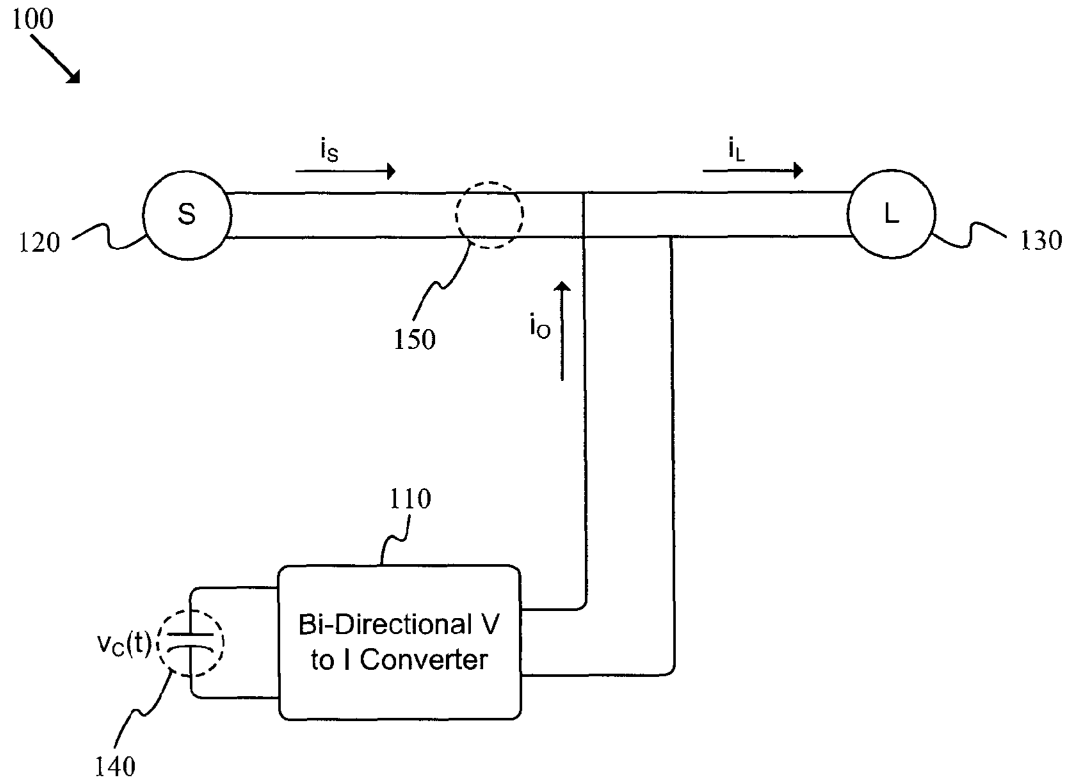
FIG. 1 illustrates a schematic block diagram of a conceptual system that includes a bi-directional voltage to current converter according to an exemplary embodiment of the invention.

FIG. 1 illustrates a schematic block diagram of a conceptual system 100 that includes a bi-directional voltage to current converter 110 of some embodiments. As shown, system 100 may include bi-directional voltage to current converter 110 (having an associated load current, $i_O$) one or more sources 120 (having total source current, $i_S$), one or more loads 130 (having total load current, $i_L$), a capacitor 140 (and/or other energy storage device, such as a battery) having an associated voltage, and a bus 150. One of ordinary skill in the art will recognize that although the currents are shown as flowing in one direction, one or more of the currents may flow in the other direction, as appropriate (e.g., one or more of the currents may be negative).

The connections among the various components 110-140 are conceptual and an actual implementation may include various other appropriate components, signals, supplies, circuitry, etc. In addition, various connections and/or components have been omitted for clarity. For instance, the bi-directional voltage to current converter 110 may receive signals from sensors, processors, and/or other appropriate components (e.g., the converter may receive signals from current sensing elements that are configured to measure $i_S$, $i_L$, and/or $i_O$).

The source(s) 120, load(s) 130, and converter 110 may all be connected to a single bus 150, as shown. The bus 150 may be a 270V bus in some embodiments, having a supply line at two hundred seventy volts and a return line at zero volts. Different embodiments may be implemented with different specific voltages and/or connection schemes, as appropriate.

During operation, the bi-directional voltage to current converter 110 may sense the difference between the source current and the load current, and adjust its output current such that the DC source may provide only the average current demanded by the load. In this way, rapid current variations at the source may be eliminated or reduced. The result is [maintain permissive language even with inventor feedback] an improved power quality because associated voltage drops for these variations are also eliminated. For some sources, each associated voltage drop may be proportional to a change in current.

Figure 2:
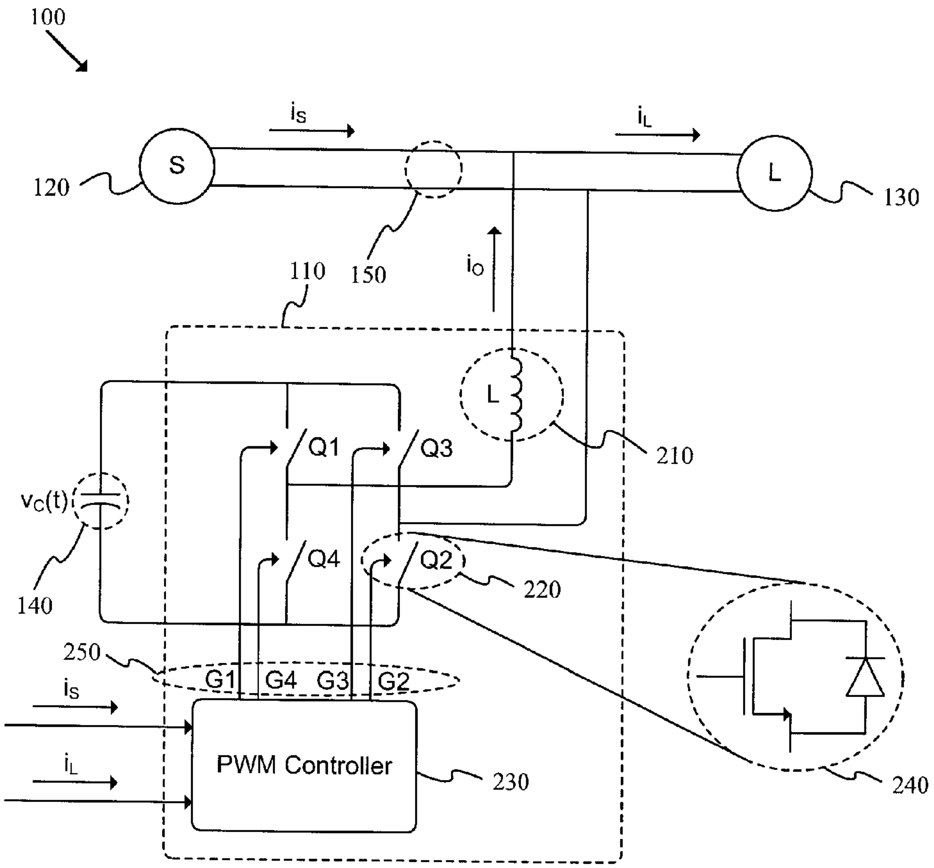
FIG. 2 illustrates a schematic block diagram of a conceptual system, showing conceptual circuitry used to implement the bi-directional voltage to current converter of some embodiments.

FIG. 2 illustrates a schematic block diagram of conceptual system 100, specifically showing conceptual circuitry used to implement the bi-directional voltage to current converter 110 of some embodiments. As shown, the converter 110 includes an inductor 210, a set of switches 220, and a pulse width modulation (PWM) controller 230.

The inductor 210 may be any appropriate inductor, and may be selected based on various relevant factors (e.g., size, cost, voltage range, etc.). The switches 220 may include any appropriate power switching devices. For instance, each switch 220 may include a power metal oxide semiconductor field-effect transistors (MOSFETs) or insulated gate bipolar transistors (IGBTs) with anti-parallel diode, as shown in exploded view 240. The switches 220 may be controlled using signals 250 provided by the PWM controller 230.

Figure 3:
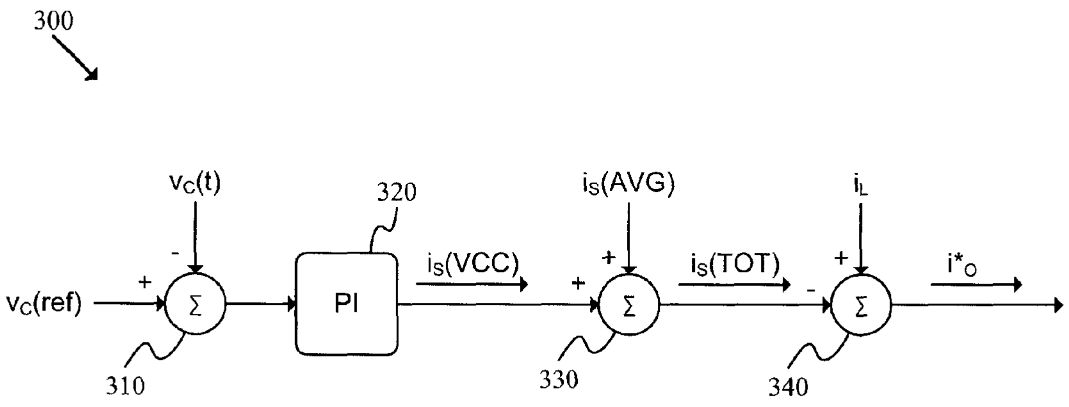
FIG. 3 illustrates a schematic block diagram of a conceptual system that may be used to generate a reference current for the bi-directional voltage to current converter of some embodiments.

FIG. 3 illustrates a schematic block diagram of a conceptual system 300 that may be used to generate a reference current for the bi-directional voltage to current converter 110 of some embodiments. As shown, system 300 may include a first summing node 210310, a power inverter 320 (which may be included as a sub-element of the source 120 in some embodiments), a second summing node 330, a third summing node 340, and the bi-directional voltage to current converter 110 of some embodiments.

Although various components of the system 300 are shown as being external to the converter 110 (e.g., components 310-340), one of ordinary skill in the art will recognize that in some embodiments some or all system components may be included in the converter 110. Alternatively, the various signals generated by the system 300 may be received from other sources, when appropriate (e.g., in some embodiments a processor, controller, and/or other appropriate device may provide the signals to the converter).

As shown in FIG. 23, the first summing node 310 may receive a reference voltage and a voltage from an energy storage device and may generate an error signal based on the difference between the reference voltage and the energy storage device voltage. The error signal may be provided to the power inverter 320.

The power inverter 320 may, in turn, generate a transient output current. The power inverter 320 may be configured to provide slow closed loop operation so that during time intervals between pulses of peak power the DC input source may provide energy to replenish and recharge the energy storage device to the desired output voltage such that the energy storage device may be able to maintain a regulated output.

The second summing node 330 may receive the transient output current and an average source current and may generate an output signal that represents the total available source current. Summing node 240340 may receive a load current and the total source current and may generate a reference current based on the difference between the load current and the total source current.

The reference current may be provided to the converter 110. In addition, the converter 110 may receive a voltage from the energy storage device and a signal representing average source current. The converter 110, in turn, may generate an output signal having a magnitude and polarity that corresponds to the transient difference between available source current and required load current. The calculations may be done by PWM controller 230 described above in reference to FIG. 2.

Figure 4:
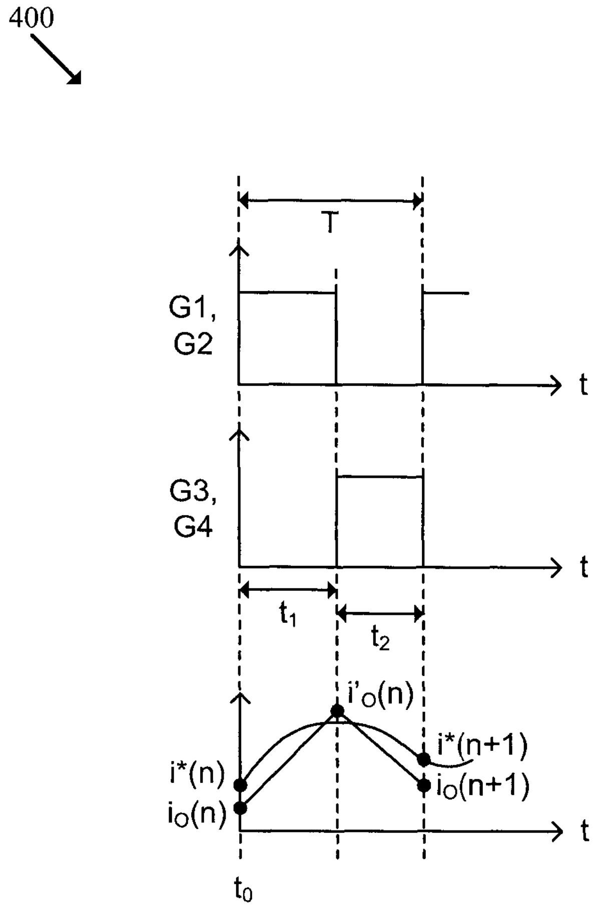
FIG. 4 illustrates an example timing diagram that may be used during operation of the circuitry of FIG. 2.

FIG. 4 illustrates an example timing diagram 400 that may be used during operation of the system 100 of FIG. 2. Such operation may be further described by reference to equations (1)-(7) below, where such calculations may be repeated at appropriate regular intervals or time steps. The following calculations are based on several assumptions and/or simplifications, including: any dead time interval is neglected, the effective series resistance (ESR) of the inductor 210 is neglected, the voltage associated with the capacitor or other storage device is assumed to be constant during an interval from $t_0$ to $t_0$+T, where T is the PWM period of the controller 230.

The PWM controller 230 may receive measured values of $i_S$ and $i_L$ and calculate an average source current based on a running discrete Fourier series calculation at every time step. Using closed loop control (e.g., elements 310-320 described above in reference to FIG. 3), a source current $i_S$(VCC) is drawn to keep the voltage across the energy storage device 140 constant.

During a first operation interval from $t_0$ to $t_0+t_1$, switches Q1 and Q2 are closed, and the operation of the circuitry is defined by equation (1) below.

$$L\frac{di}{dt} = v_c(t) - V_s \tag{1}$$

Where L is the inductance of inductor 210, $v_c(t)$ is the voltage across capacitor 140, and $V_S$ is the voltage at the output of source 120. After discretization, equation (1) may be represented as equation (2) below.

$$L\frac{i_o'(n) - i_o(n)}{t_1} = V_c - V_s \tag{2}$$

Where, as shown in timing diagram 400, $t_1$ is a duration of a first operating state, $V_S$ is the voltage of capacitor 140 at time $t_0$, $i'_O(n)$ is an output current of converter 110 at time $t_1$, and $i_O(n)$ is an output current of converter 110 at time $t_0$.

During a second operation interval from $t_1$ to $t_1+t_2$, switches Q3 and Q4 are closed, and the operation of the circuitry is defined by equation (3) below.

$$L\frac{di}{dt} = -v_c(t) - V_s \tag{3}$$

After discretization, equation (3) may be represented as equation (4) below.

$$L\frac{i_o(n+1) - i_o'(n)}{t_2} = V_c - V_s \tag{4}$$

Where, as shown in timing diagram 400, $t_2$ is a duration of a second operating state and $i_O(n+1)$ is an output current of converter 110 at time $t_1+t_2$. Equations (2) and (4) may be combined to form equation (5) below.

$$i_0(n+1) = i_o(n) + \frac{(V_c - V_s)}{L}(t_1 - t_2) \tag{5}$$

Equation (6) below may be used to estimate the value of $i_O(n+1)$, as the output current at the following (n+1) PWM cycle is driven to match the reference current $i^*_O(n)$ calculated at the previous PWM cycle.

$$i_O(n+1) \approx i^*_O(n) \tag{6}$$

The reference current $i^*_O(n)$ for the output current of controller 330 may be estimated by subtracting $i_S(TOT)$ from $i_L(n)$, where $i_S(TOT)$ is calculated as the sum of $i_S(VCC)$ and $i_S(AVG)$.

Equation (7) below indicates the relationship among $t_1$, $t_2$, and T.

$$t_1+t_2=T \tag{7}$$

Equations (6) and (7) may be combined with equation (5) to calculate the values of $t_1$ and $t_2$. The calculated values of $t_1$ and $t_2$ may be provided to the PWM controller 230 such that the operation of switches 220 may be controlled in a way to provide the desired output current to match the available source current and needed load current.

The two pairs of switches 220 (Q1 and Q2, Q3 and Q4) may be controlled such that either one pair or the other pair is activated at any given time. (Some embodiments may include a deadtime, such that any two switches from the same leg cannot be turned on at the same time to avoid short circuit of the DC side.) In the example of FIG. 2, if a first pair of switches (Q1 and Q2) is activated, a first terminal of capacitor 140, having positive voltage ($v_c(t)$), is applied to a first terminal of the inductor (through Q1), while a second terminal of the inductor is connected to the supply line of supply bus 150 and a second terminal of capacitor 140 is connected to the return of supply bus 150 (through G2). If a second pair of switches (Q3 and Q4) is activated, the second terminal of capacitor 140, having negative voltage ($-v_e(t)$) is applied to the first terminal of the inductor (through Q4), while the second terminal of the inductor remains connected to the supply line of supply bus 150 and the first terminal of capacitor 140 is connected to the return of supply bus 150 (through Q3).

As shown in FIG. 4 for an exemplary sampling period, (and referring to the example circuitry of FIG. 2), if the first pair of switches is closed, the output current of the converter 110 rises linearly, while if the second pair of switches is closed, the output current of the converter 110 falls linearly (where the rate of fall is the same as the rate of rise). In this way, the pairs of switches may be used to increase or decrease the output current of the converter 110 relative to a previous value, by varying the relative time that each pair of switches is activated.

The calculations described above in reference to equations (1)-(7) may be performed by one or more appropriate entities (e.g., processors, microcontrollers, dedicated circuitry, etc.).

Figure 5:
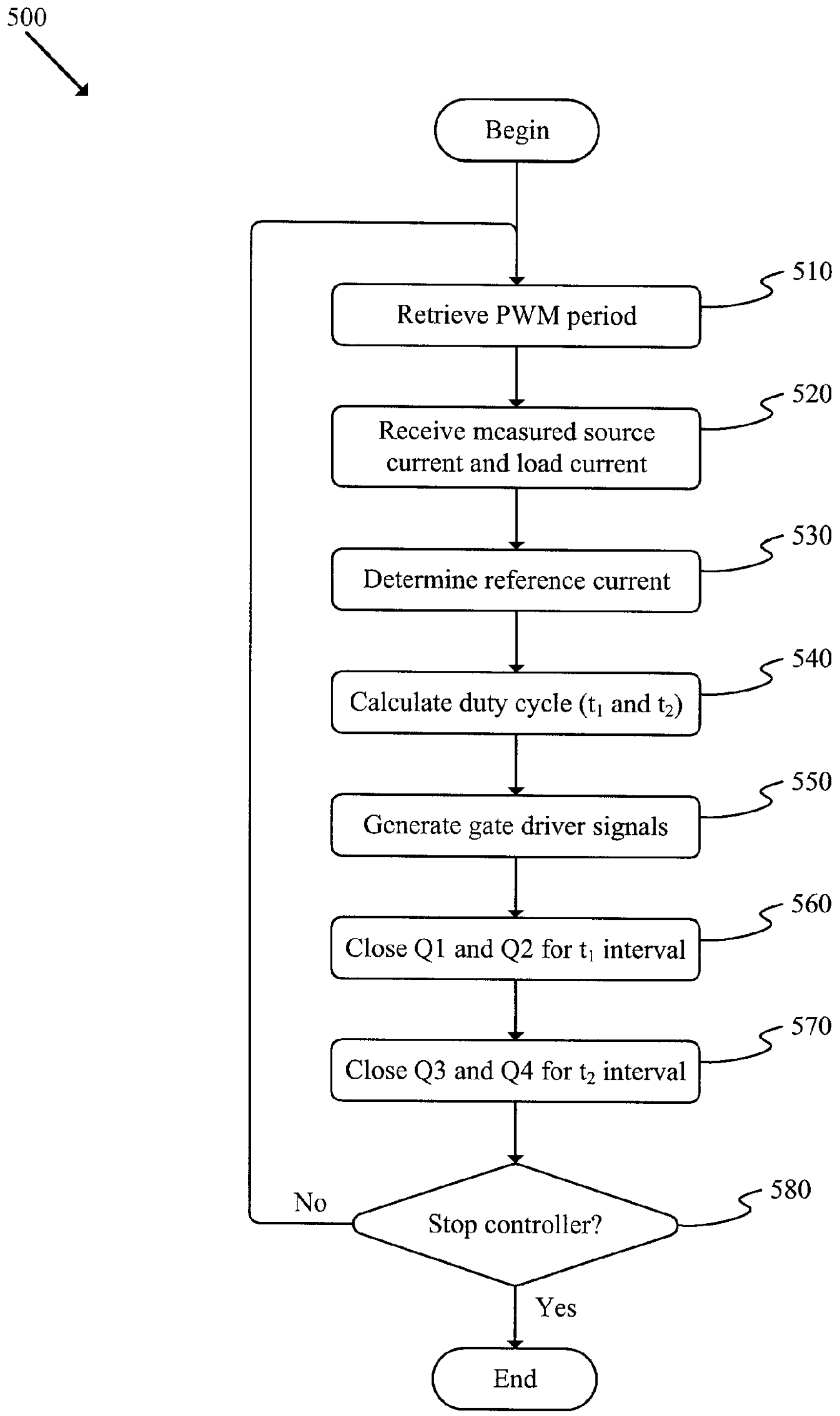
FIG. 5 illustrates a flow chart of a conceptual process used by some embodiments to generate a set of control signals used by the bi-directional voltage to current converter of some embodiments.

FIG. 5 illustrates a flow chart of a conceptual process 500 used by some embodiments to generate a set of control signals used by a bi-directional voltage to current converter of some embodiments. Such a process may be implemented using various components and calculations, as described above in reference to FIGS. 1-4.

Process 500 may begin by retrieving (at 510) a PWM period (e.g., period T described above). Such a period may be retrieved in various appropriate ways (e.g., the period may be stored in memory as a numeric value). Alternatively, the PWM period may be received from a component such as a processor. The process then receives (at 520) measured source current and load current for the current cycle. The currents may be measured in various appropriate ways (e.g., using current sensors or current sensing resistors placed at appropriate locations to measure the source and load currents). The process may then determine (at 530) a reference current. The reference current may be received from an external element (e.g., a processor) or calculated internally. Such a reference current may be calculated as described above in reference to FIG. 3.

Process 500 may then calculate (at 530) a duty cycle (values for $t_1$ and $t_2$) based at least partly on the reference current and PWM period. Such a calculation may be performed as described above in reference to equations (1)-(7). The process may then generate (at 550) gate driver signals based at least partly on the calculated duty cycle. The generated gate driver output signals may be generated based on the calculated values of $t_1$ and $t_2$, as described above in reference to equations (1)-(7). Next, the generated gate driver signals may be applied to the switches such that Q1 and Q2 close (at 560) for the $t_1$ interval and Q3 and Q4 close (at 570) for the $t_2$ interval. The gate driver signals may be provided using various appropriate output circuitry.

Next, process 500 may determine (at 580) whether to stop the bi-directional voltage to current converter. Such a determination may be based on various appropriate factors (e.g., a received command signal, a state of a physical switch, sensing of an attached power source, etc.). When the process determines (at 580) that the controller should not be stopped, the process may return to operation 510 and continue to the next operation cycle. In some embodiments, the PWM period may not change from cycle to cycle and thus, the process may return to operation 520 after determining (at 580) that the controller should not be stopped. When the process determines (at 580) that the controller should be stopped, the process may end.

One of ordinary skill in the art will recognize that process 500 may be performed in various different ways without departing from the spirit of the invention. For instance, the operations of the process may be performed in different orders than those described above. In addition, various operations may be omitted and/or other operations may be included. Furthermore, the process may be implemented as a set of sub-processes or as part of a larger macro-process.

Many of the processes and modules described above may be implemented as software processes that are specified as at least one set of instructions recorded on a non-transitory storage medium. When these instructions are executed by one or more computational element(s) (e.g., microprocessors, microcontrollers, Digital Signal Processors (DSPs), Application-Specific ICs (ASICs), Field Programmable Gate Arrays (FPGAs), etc.) the instructions cause the computational element(s) to perform actions specified in the instructions.

Figure 6:
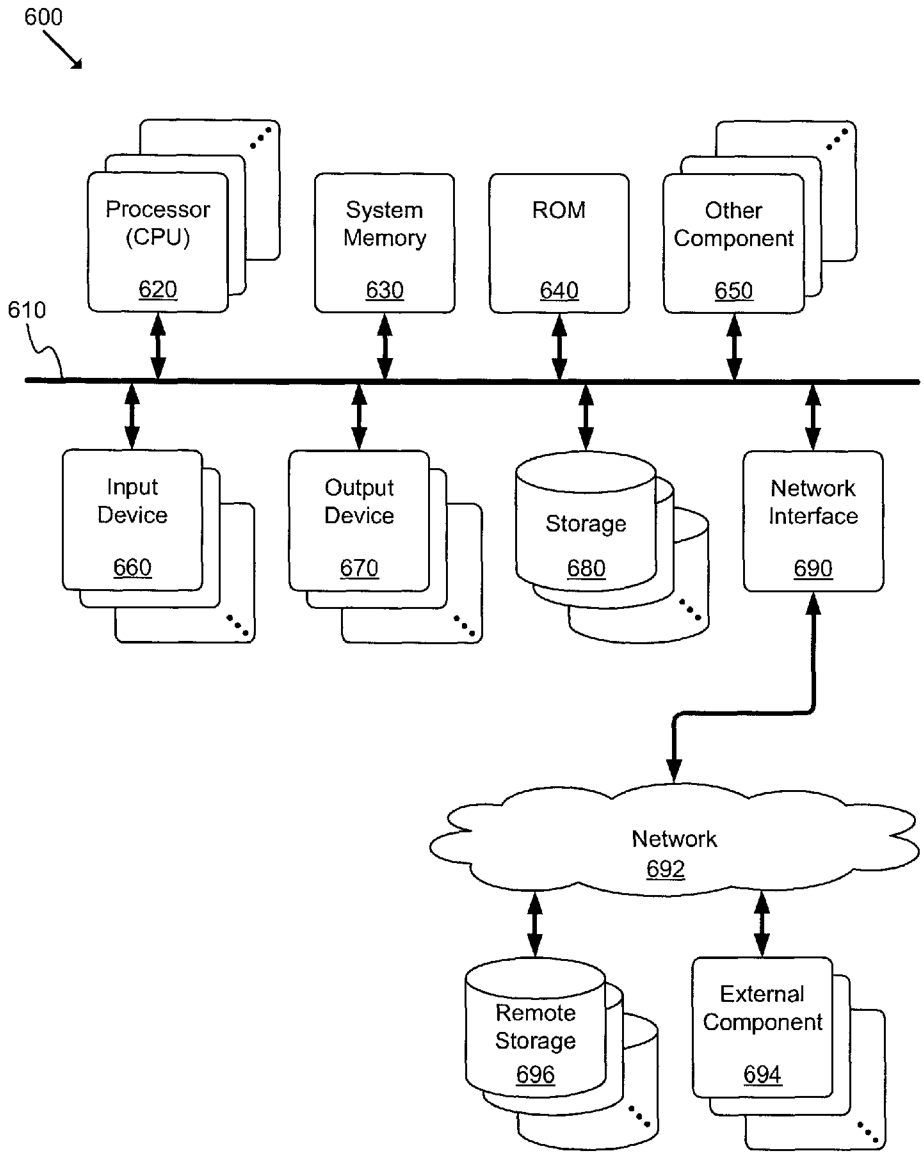
FIG. 6 illustrates a schematic block diagram of a conceptual computer system with which some embodiments of the invention may be implemented.

FIG. 6 conceptually illustrates a schematic block diagram of a computer system 600 with which some embodiments of the invention may be implemented. For example, the systems and/or operations described above in reference to FIGS. 1-4 may be at least partially implemented using computer system 600. As another example, the process described in reference to FIG. 5 may be at least partially implemented using sets of instructions that are executed using computer system 600.

Computer system 600 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a server).

Computer system 600 may include a bus 610, at least one processing element 620, a system memory 630, a read-only memory ("ROM") 640, other components (e.g., a graphics processing unit) 650, input devices 660, output devices 670, permanent storage devices 680, and/or a network connection 690. The components of computer system 600 may be electronic devices that automatically perform operations based on digital and/or analog input signals.

Bus 610 represents all communication pathways among the elements of computer system 600. Such pathways may include wired, wireless, optical, and/or other appropriate communication pathways. For example, input devices 660 and/or output devices 670 may be coupled to the system 600 using a wireless connection protocol or system. The processor 620 may, in order to execute the processes of some embodiments, retrieve instructions to execute and data to process from components such as system memory 630, ROM 640, and permanent storage device 680. Such instructions and data may be passed over bus 610.

ROM 640 may store static data and instructions that may be used by processor 620 and/or other elements of the computer system. Permanent storage device 680 may be a read-and-write memory device. This device may be a non-volatile memory unit that stores instructions and data even when computer system 600 is off or unpowered. Permanent storage device 680 may include a mass-storage device (such as a magnetic or optical disk and its corresponding disk drive).

Computer system 600 may use a removable storage device and/or a remote storage device as the permanent storage device. System memory 630 may be a volatile read-and-write memory, such as a random access memory ("RAM"). The system memory may store some of the instructions and data that the processor uses at runtime. The sets of instructions and/or data used to implement some embodiments may be stored in the system memory 630, the permanent storage device 680, and/or the read-only memory 640. For example, the various memory units may include instructions for generating PWM signals in accordance with some embodiments. Other components 650 may perform various other functions. These functions may include.

Input devices 660 may enable a user to communicate information to the computer system and/or manipulate various operations of the system. The input devices may include keyboards, cursor control devices, audio input devices and/or video input devices. Output devices 670 may include printers, displays, and/or audio devices. Some or all of the input and/or output devices may be wirelessly or optically connected to the computer system.

Finally, as shown in FIG. 6, computer system 600 may be coupled to a network 692 through a network adapter 690 in wired and/or wireless fashion. For example, computer system 600 may be coupled to a web server on the Internet such that a web browser executing on computer system 600 may interact with the web server as a user interacts with an interface that operates in the web browser.

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 600 may be used in conjunction with the invention. Moreover, one of ordinary skill in the art will appreciate that many other system configurations may also be used in conjunction with the invention or components of the invention.

Moreover, while the examples shown may illustrate many individual modules as separate elements, one of ordinary skill in the art would recognize that these modules may be combined into a single functional block or element. One of ordinary skill in the art would also recognize that a single module may be divided into multiple modules.

It should be understood, of course, that the foregoing relates to exemplary embodiments of the invention and that modifications may be made without departing from the spirit and scope of the invention as set forth in the following claims.

I claim:

1. A system adapted to regulate output voltage of a supply bus, the system comprising:

a source having an internal impedance adapted to supply a source current to the supply bus;

a load adapted to draw a load current from the supply bus;

an energy storage device;

a bi-directional voltage to current converter connected to the supply bus adapted to provide an output current, wherein the output current is at least partly based on the source current and the load current; and a reference current generation circuitry including a first summing node adapted to receive a reference voltage and a voltage provided by the energy storage device and generate an output signal based at least partly on a difference between the reference voltage and the voltage provided by the source; a power inverter to receive the output signal from the first summing node; a second summing node adapted to receive an output signal from the power inverter and an average supply current, and generate an output signal representing total source current based at least partly on a sum of the received output signal from the first summing node and the average supply current; and a third summing node adapted to receive the output signal from the second summing node and the load current, and generate a reference current based at least partly on a difference between the load current and the output signal received from the second summing node.

2. The system of claim 1, wherein the bi-directional voltage to current converter comprises:

an inductor coupled to the supply bus;

at least one controlled switch adapted to connect the inductor to an energy storage device; and a pulse-width modulation (PWM) controller adapted to control the operation of the set of switches.

3. The system of claim 1, wherein the load current is subject to repeated variations over time which constitute the load receiving power or regenerating power back to the source.

4. A bi-directional voltage to current converter comprising:

an inductor coupled to a first line of a supply bus;

a set of switches adapted to connect the inductor in series with an energy storage device;

a pulse-width modulation (PWM) controller adapted to control the operation of the set of switches; and a reference current generation circuitry including a first summing node adapted to receive a reference voltage and a voltage provided by the energy storage device and generate an output signal based at least partly on a difference between the reference voltage and a voltage provided by a source; a power inverter to receive the output signal from the first summing node; a second summing node adapted to receive an output signal from a power inverter and an average supply current, and generate an output signal representing total source current based at least partly on a sum of the received output signal from the first summing node and the average supply current; and a third summing node adapted to receive the output signal from the second summing node and a load current, and generate a reference current based at least partly on a difference between the load current and the output signal received from the second summing node.

5. The bi-directional voltage to current converter of claim 4, wherein the set of switches is further adapted to allow an output of the energy storage device to be applied to the inductor in a first polarity or a second polarity.

6. The bi-directional voltage to current converter of claim 5, wherein connecting the inductor to the energy source in the first polarity causes an output current of the bi-directional voltage to current converter to increase relative to a previous value and connecting the inductor to the energy source in the second polarity causes the output current of the bi-directional voltage to current converter to decrease relative to a previous value.

7. The bi-directional voltage to current converter of claim 4, wherein an output current of the bi-directional voltage to current converter is based at least partly on a duty cycle of the PWM controller.

8. The bi-directional voltage to current converter of claim 7, wherein the duty cycle of the PWM controller is based at least partly on a retrieved PWM period and a received reference current.

9. The bi-directional voltage to current converter of claim 8, wherein the received reference current is based at least partly on a difference between a source current associated with a source and a load current associated with a load.

10. The bi-directional voltage to current converter of claim 9, wherein the source and load are coupled to the supply bus.

11. A method adapted to provide a set of gate driver outputs for a pulse width modulation (PWM) controller, the method comprising:

retrieving a PWM period associated with the PWM controller;

determining a reference current associated with a source and a load coupled to a supply bus;

calculating a duty cycle based at least partly on the retrieved PWM period and the received reference current;

generating the set of gate driver outputs based at least partly on the calculated duty cycle; and providing a reference current generation circuitry including a first summing node adapted to receive a reference voltage and a voltage provided by the energy storage device and generate an output signal based at least partly on a difference between the reference voltage and a voltage provided by a source; a power inverter to receive the output signal from the first summing node; a second summing node adapted to receive an output signal from a power inverter and an average supply current, and generate an output signal representing total source current based at least partly on a sum of the received output signal from the first summing node and the average supply current; and a third summing node adapted to receive the output signal from the second summing node and a load current, and generate a reference current based at least partly on a difference between the load current and the output signal received from the second summing node.

12. The method of claim 11, wherein the reference current is based at least partly on a difference between a source current associated with the source and a load current associated with the load.

13. The method of claim 11, wherein calculating the duty cycle is based at least partly on a value of an inductor and an output value of an energy storage device.

14. The method of claim 13, wherein calculating the duty cycle is based at least partly on a voltage generated by the source.

15. The method of claim 11, wherein the PWM period is a constant value.

16. The method of claim 11, wherein the duty cycle is calculated such that an output current of a bi-directional voltage to current converter is matched to the reference current.

17. The method of claim 11, wherein only an average load current is drawn from the source and variations in a load current are managed in real-time by the converter to eliminate the need for dynamic breaking during regeneration.

* * * * *